3,594,392
DIBENZO[b,e]THIEPINE-1,1-DIOXIDES
Stanley O. Winthrop and Martin A. Davis, Montreal, Quebec, Canada, assignors to American Home Products Corporation, New York, N.Y.
No Drawing. Filed Dec. 4, 1961, Ser. No. 158,636
Int. Cl. C07d 67/00
U.S. Cl. 260—327                                          4 Claims

ABSTRACT OF THE DISCLOSURE

Dibenzo [b,e]thiepine - 1,1 - dioxides, having antihistaminic and anticholinergic properties, and intermediates therefor are disclosed.

---

This invention relates to certain new chemical compounds, the dibenzo [b,e]thiepine-1,1-dioxides, and to their preparation from available starting materials.

This invention also relates to salts of these dibenzo [b,e]thiepine - 1,1 - dioxides with pharmacologically-acceptable, non-toxic acids.

More particularly, our invention relates to the new chemical compound 11-(3'-dimethylaminopropylidene)-5,6-dihydrodibenzo [b,e]thiepine - 1,1 - dioxide; to its acid addition salts, particularly the hydrohalides; and to a process by which these new chemical compounds may be prepared from available starting materials.

These new chemical compounds possess antihistaminic and anticholinergic properties. They also exhibit some of the central nervous system activities which are characteristic of tranquilizers and anti-depressants; for example, they potentiate alcohol narcosis and elicit behavioral changes in conditioned responses of animals.

In preparing the new chemical compounds we prefer to start with o-carboxybenzyl phenyl thioether, a compound which is described, for example, in British Pat. No. 773,594. See also Chemical Abstracts, 52, page 1244e.

Ortho-carboxybenzyl phenyl thioether is cyclized by heating with phosphorus pentoxide, preferably at reflux temperature and in an inert solvent such as xylene. This results in the ketone, 11-keto-5,6-dihydrodibenzo [b,e] thiepine.

This ketone is then treated with hydrogen peroxide, thereby forming 11 - keto-5,6-dihydrodibenzo [b,e]thiepine - 1,1 - dioxide. This reaction is preferably carried out at a relatively low temperature in a solution containing glacial acetic acid and acetic anhydride.

The last-named compound, 11-keto - 5,6 - dihydrodibenzo [b,e] thiepine - 1,1 - dioxide, is then reacted with a dimethylaminopropyl chloride Grignard reagent, thus forming 11 - hydroxy - 11 - (3'-dimethylaminopropyl)-5,6-dihydrodibenzo [b,e]thiepine - 1,1 - dioxide. This reaction is preferably carried out in an inert solvent and at a relatively low temperature, such as room temperature or below. At the conclusion of the reaction period the Grignard complex may be hydrolyzed, as by treatment with ammonium chloride, and the alcohol product extracted from the reaction mixture by means of an organic solvent.

The alcohol, i.e. the compound 11-hydroxy-11-(3'-dimethylaminopropyl) - 5,6 - dihydrodibenzo [b,e]thiepine-1,1-dioxide, is then dehydrated to yield 11-(3'-dimethylaminopropylidene) - 5,6 - dihydrodibenzo [b,e]thiepine-1,1-dioxide. This is preferably accomplished by heating with glacial acetic acid in an acid solution.

The free base, i.e. the compound 11-(3'-dimethylaminopropylidene) - 5,6 - dihydrodibenzo [b,e]thiepine-1,1-dioxide, may be prepared from its hydrohalide salt by treatment of the latter with an aqueous base. Alternatively, the free base may be converted to its acid addition salts, such as its hydrohalide acid addition salts, by treatment of the base with a solution of the particular acid whose salt is desired, the step being preferably carried out in an organic solvent solution.

The illustrative examples which follow give further details of our process for the preparation of these pharmacologically-active compounds.

The chemical reactions occurring may be indicated as follows:

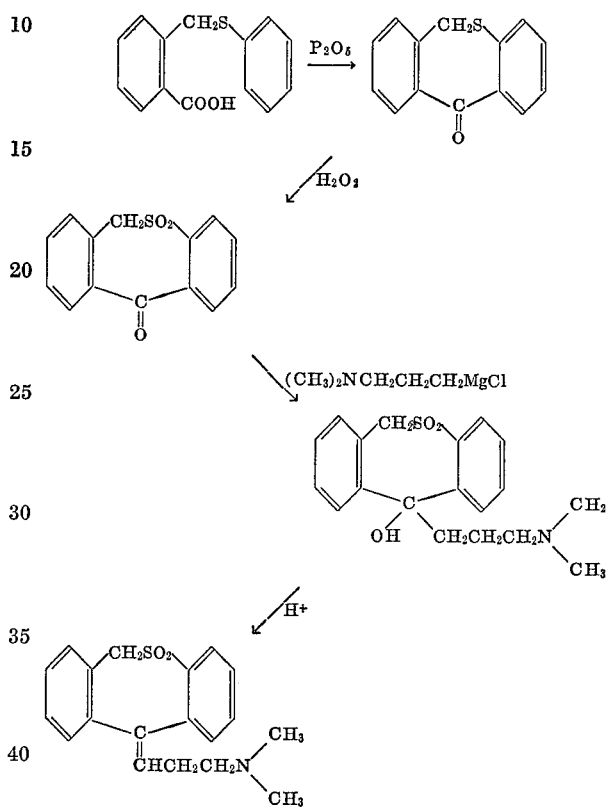

The following examples illustrate our invention.

EXAMPLE 1

11-keto-5,6-dihydrodibenzo[b,e]thiepine

Ortho-carboxybenzyl phenyl thioether (45.7 grams, 0.187 mole) was cyclized by heating at reflux at 1,200 mls. of xylene for sixteen hours with 138 grams of phosphorus pentoxide and 138 grams of Celite (diatomaceous earth). The reaction mixture was then filtered, and the filtrate evaporated down in vacuo i.e. at a pressure less than atmospheric, to yield 33 grams of a crude product as an oil. This was triturated with a small amount of hexane which caused it to crystallize. There were obtained 26 grams of product of M.P. 85–88° C. Two recrystallizations from hexane raised the melting point to 89–90° C. The product was 11-keto-5,6-dihydrodibenzo[b,e]thiepine.

Analysis confirmed the empiric formula $C_{14}H_{10}OS$. Required (percent): C, 74.30; H, 4.45; S, 14.17. Found (percent): C, 74.20; H, 4.56; S, 14.09.

EXAMPLE 2

11-keto-5,6-dihydrodibenzo[b,e]thiepine-1,1-dioxide

The ketone, as prepared in Example 1 (78 grams, 0.35 mole), was added to a solution of 150 mls. of glacial acetic acid and 150 mls. of acetic anhydride. Hydrogen peroxide, 30%, (95 mls.), was added dropwise while the temperature was maintained at approximately 4° C. by means of an ice-water bath. The reaction mixture was then allowed to warm up to room temperature and stand for seventy-two hours. The product precipitated out and was filtered off to yield 59 grams of product of M.P. 111–114° C. This product was 11-keto-5,6-dihydrodibenzo[b,e]thiepine-1,1-dioxide. Two recrystallizations from ethanol raised the M.P. to 122–124° C.

Analysis confirmed the empiric formula $C_{14}H_{10}SO_3$. Required (percent): C, 65.10; H, 3.93; S, 12.41. Found (percent): C, 65.51; H, 3.87; S, 12.18.

EXAMPLE 3

11-hydroxy-11-(3'-dimethylaminopropyl)-5,6-dihydrodibenzo [b,e]thiepine-1,1-dioxide The above ketone as prepared in Example 2, 11-keto-5,6-dihydrodibenzo[b,e]thiepine-1,1-dioxide (17.3 grams, 0.067 mole), in 50 mls. of tetrahydrofuran, was added dropwise to 200 mls. of tetrahydrofuran containing the Grignard reagent prepared from dimethylaminopropylchloride (16.3 grams, 0.134 mole) and magnesium (3.2 grams, 0.134 mole). During the addition the temperature was maintained at approximately 5° C. by means of an ice-water bath. The addition was completed in twenty minutes. The reaction mixture was then stirred for an additional sixteen hours at room temperature. It was hydrolyzed with a solution of ammonium chloride and the hydrolysis mixture was extracted with chloroform. The chloroform extract was dried over sodium sulfate and evaporated down, leaving an oil residue which, on trituration with ether, gave 8.3 grams of solid product, M.P. 142–144° C. One recrystallization from ethanol did not change the melting point. This product was 11-hydroxy-11 - (3' - dimethylaminopropyl)-5,6-dihydrodibenzo[b,e]thiepine-1,1-dioxide.

Analysis confirmed the empiric formula $C_{19}H_{23}NSO_3$. Required (percent): N, 4.06; S, 9.28. Found (percent): N, 4.10; S, 9.27.

EXAMPLE 4

11-(3'-dimethylaminopropylidene)-5,6-dihydrodibenzo[b,e]thiepine-1,1-dioxide

The above alcohol, 11-hydroxy-11-(3'-dimethylaminopropyl)-5,6-dihydrodibenzo[b,e]thiepine-11-dioxide, (2.7 grams), was added to a solution of 15 mls. of concentrated hydrochloric acid and 40 mls. of glacial acetic acid, and heated at reflux for three hours. The reaction mixture was then filtered, neutralized with aqueous sodium hydroxide, and extracted with ether. The ether extract was dried over sodium sulfate and then treated with hydrogen chloride gas, causing the hydrochloride to precipitate as a solid: 2.3 grams, M.P. 249–252° C. One recrystallization from isopropanol-ether did not change the melting point. This product was the hydrochloride salt of 11-(3'-dimethylaminopropylidene) - 5,6-dihydrodibenzo[b,e]thiepine - 1,1-dioxide.

Analysis confirmed the empiric formula of $$C_{19}H_{22}NSO_2Cl$$

Required (percent): S, 8.82; Cl, 9.74. Found (percent): S, 8.82; Cl, 9.92.

The pure free base was prepared by dissolving a sample of the hydrochloride in water, neutralizing the solution with aqueous sodium hydroxide, and extracting with chloroform. The chloroform extract was dried and evaporated down to yield the free base, 11-(3'-dimethylaminopropylidene)-5,6 - dihydrodibenzo[b,e]thiepine-1,1-dioxide, as a light brown viscous oil. It was further characterized by its infrared spectral data: max. in $CHCl_3$: 2940 (m), 2780 (m), 1468 (m), 1310 (s), 1160 (s), 1125 (s) cm.$^1$.

We claim:

1. A compound selected from the group which consists of 11-(3'-dimethylaminopropylidene)-5,6-dihydrodibenzo[b,e]-thiepine-1,1-dioxide and its acid addition salts with pharmacologically-acceptable, non-toxic acids.

2. 11 - (3'-dimethylaminopropylidene)-5,6-dihydrodibenzo[b,e]thiepine-1,1'-dioxide.

3. The hydrochloride salt of 11-(3'-dimethylaminopropylidene)-5,6-dihydrodibenzo[b,e]thiepine-1,1-dioxide.

4. The compound of the formula:

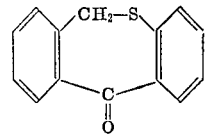

References Cited

UNITED STATES PATENTS

| 2,684,372 | 7/1962 | Amstutz | 260—328 |
| 2,951,082 | 8/1960 | Sprague et al. | 260—240 |
| 3,116,291 | 12/1963 | Petersen et al. | 260—240 |

JAMES A. PATTEN, Primary Examiner

U.S. Cl. X.R.

260—999